US011947896B2

(12) United States Patent
O'Donovan et al.

(10) Patent No.: US 11,947,896 B2
(45) Date of Patent: Apr. 2, 2024

(54) FONT RECOMMENDATION

(71) Applicant: Adobe Inc., San Jose, CA (US)

(72) Inventors: Peter Evan O'Donovan, Seattle, WA (US); Siddartha Reddy Turpu, Everett, WA (US); Razvan Cotlarciuc, Seattle, WA (US); Oliver Markus Michael Brdiczka, San Jose, CA (US); Nipun Jindal, Delhi (IN); Costin-Stefan Ion, Mill Creek, WA (US)

(73) Assignee: Adobe Inc., San Jose, CA (US)

( * ) Notice: Subject to any disclaimer, the term of this patent is extended or adjusted under 35 U.S.C. 154(b) by 122 days.

(21) Appl. No.: 17/848,795

(22) Filed: Jun. 24, 2022

(65) Prior Publication Data
US 2023/0419014 A1 Dec. 28, 2023

(51) Int. Cl.
*G06F 40/109* (2020.01)
*G06F 16/583* (2019.01)
*G06F 40/126* (2020.01)
*G06V 30/413* (2022.01)

(52) U.S. Cl.
CPC ........ *G06F 40/109* (2020.01); *G06F 16/5846* (2019.01); *G06F 40/126* (2020.01); *G06V 30/413* (2022.01)

(58) Field of Classification Search
None
See application file for complete search history.

(56) References Cited

U.S. PATENT DOCUMENTS

| | | |
|---|---|---|
| 6,026,417 A | 2/2000 | Ross et al. |
| 9,449,080 B1 | 9/2016 | Zhang |
| 9,501,724 B1 | 11/2016 | Yang et al. |
| 9,836,765 B2 | 12/2017 | Hariri et al. |
| 10,402,064 B1 | 9/2019 | Al-Sallami et al. |
| 10,629,186 B1 | 4/2020 | Slifka |
| 11,829,710 B2 | 11/2023 | Brdiczka et al. |
| 11,886,809 B1 | 1/2024 | Jindal et al. |
| 2008/0250026 A1 | 10/2008 | Linden et al. |
| 2013/0103628 A1 | 4/2013 | Skelton et al. |
| 2013/0179252 A1 | 7/2013 | Dong et al. |
| 2016/0007065 A1 | 1/2016 | Peles et al. |
| 2016/0055132 A1 | 2/2016 | Garrison |
| 2016/0349936 A1 | 12/2016 | Cho et al. |
| 2017/0061286 A1 | 3/2017 | Kumar et al. |
| 2017/0097743 A1 | 4/2017 | Hameed et al. |
| 2017/0344656 A1 | 11/2017 | Koren et al. |
| 2018/0121881 A1 | 5/2018 | Kumar et al. |
| 2019/0026280 A1 | 1/2019 | Aviyam et al. |

(Continued)

OTHER PUBLICATIONS

U.S. Appl. No. 17/583,818, "Corrected Notice of Allowability", U.S. Appl. No. 17/583,818, dated Aug. 24, 2023, 4 pages.

(Continued)

*Primary Examiner* — Frank S Chen
(74) *Attorney, Agent, or Firm* — FIG. 1 Patents

(57) ABSTRACT

Font recommendation techniques are described that provide recommendations of fonts based on a variety of factors, automatically and without user intervention in real time. This is performable in a variety of ways by addressing a wide range of considerations as part of machine learning, examples of which include context, popularity, similarity, customization, and topic compatibility.

20 Claims, 10 Drawing Sheets

(56) References Cited

U.S. PATENT DOCUMENTS

| | | |
|---|---|---|
| 2019/0034976 A1 | 1/2019 | Hamedi et al. |
| 2019/0108203 A1 | 4/2019 | Wang et al. |
| 2019/0130231 A1 | 5/2019 | Liu et al. |
| 2020/0143448 A1 | 5/2020 | Steck |
| 2020/0153934 A1 | 5/2020 | Burbank et al. |
| 2020/0159995 A1 | 5/2020 | Mukherjee et al. |
| 2020/0394699 A1 | 12/2020 | Mueller |
| 2021/0044674 A1 | 2/2021 | Govan et al. |
| 2021/0103632 A1 | 4/2021 | Kadia et al. |
| 2021/0103930 A1 | 4/2021 | Fu et al. |
| 2021/0109958 A1 | 4/2021 | Behtash et al. |
| 2021/0125054 A1* | 4/2021 | Banik ................ H04N 21/4666 |
| 2021/0133249 A1 | 5/2021 | Parhi et al. |
| 2021/0200943 A1 | 7/2021 | Aviyam et al. |
| 2021/0224319 A1 | 7/2021 | Ingel et al. |
| 2021/0334666 A1 | 10/2021 | Lundin et al. |
| 2021/0342785 A1 | 11/2021 | Mann et al. |
| 2021/0406838 A1 | 12/2021 | Ramanath et al. |
| 2022/0124055 A1 | 4/2022 | Sharifi et al. |
| 2022/0139041 A1 | 5/2022 | Li et al. |
| 2022/0180650 A1 | 6/2022 | Tang et al. |
| 2022/0215606 A1 | 7/2022 | Radford et al. |
| 2022/0237935 A1 | 7/2022 | Liu et al. |
| 2022/0351021 A1 | 11/2022 | Biswas et al. |
| 2022/0414320 A1 | 12/2022 | Dolan et al. |
| 2023/0114293 A1 | 4/2023 | Liu et al. |
| 2023/0237251 A1 | 7/2023 | Brdiczka et al. |
| 2023/0315491 A1 | 10/2023 | Brdiczka et al. |
| 2023/0419015 A1 | 12/2023 | O'Donovan et al. |

OTHER PUBLICATIONS

U.S. Appl. No. 17/583,818, "Notice of Allowance", U.S. Appl. No. 17/583,818, Jul. 17, 2023, 25 pages.

U.S. Appl. No. 17/938,253, "Final Office Action", U.S. Appl. No. 17/938,253, Aug. 22, 2023, 23 pages.

U.S. Appl. No. 17/938,253, "Non-Final Office Action", U.S. Appl. No. 17/938,253, Apr. 25, 2023, 22 pages.

U.S. Appl. No. 17/977,730, "Final Office Action", U.S. Appl. No. 17/977,730, filed Aug. 17, 2023, 16 pages.

U.S. Appl. No. 17/977,730, "Notice of Allowance", U.S. Appl. No. 17/977,730, filed Oct. 4, 2023, 9 pages.

Campbell, Neill D. F., et al., "Learning a manifold of fonts", ACM Transactions on Graphics, vol. 33, No. 4, Article No. 91 [retrieved Aug. 9, 2023]. Retrieved from the Internet <https://citeseerx.ist.psu.edu/document?repid=rep1&type=pdf&doi=f86730a690806b2c3684ba7e751fabdbd8d6e3d8>., Jul. 27, 2014, 11 Pages.

Srivatsan, Nikita, et al., "A Deep Factorization of Style and Structure in Fonts", Cornell University, asXiv Preprint, arxiv.org [retrieved Oct. 4, 2023]. Retrieved from the Internet <https://arxiv.org/abs/1910.00748>, Oct. 2, 2019, 11 pages.

Brdiczka, Oliver, et al., "U.S. Application as Filed", U.S. Appl. No. 17/583,818, filed Jan. 25, 2022, 56 pages.

Brdiczka, Oliver, et al., "U.S. Application as Filed", U.S. Appl. No. 17/657,477, filed Mar. 31, 2022, 73 pages.

Brdiczka, Oliver, et al., "US Application as Filed", U.S. Appl. No. 17/938,253, filed Oct. 5, 2022, 74 pages.

He, Xiangnan, et al., "Neural Collaborative Filtering", Cornell University arXiv, arXiv.org [retrieved Aug. 26, 2022]. Retrieved from the Internet <https://arxiv.org/pdf/1708.05031.pdf>., Aug. 26, 2017, 10 Pages.

Lin, Tsung-Yi, et al., "Focal Loss for Dense Object Detection", Cornell University arXiv, arXiv.org [retrieved Aug. 26, 2022]. Retrieved from the Internet <https://arxiv.org/pdf/1708.02002.pdf>., Oct. 2017, 10 pages.

U.S. Appl. No. 17/583,818, "Non-Final Office Action", U.S. Appl. No. 17/583,818, filed Jan. 12, 2023, 18 pages.

U.S. Appl. No. 17/977,730, "Non-Final Office Action", U.S. Appl. No. 17/977,730, filed Mar. 29, 2023, 14 pages.

U.S. Appl. No. 17/657,477, "Non-Final Office Action", U.S. Appl. No. 17/657,477, filed Oct. 26, 2023, 62 pages.

U.S. Appl. No. 17/977,730, "Corrected Notice of Allowability", U.S. Appl. No. 17/977,730, filed Oct. 13, 2023, 2 pages.

U.S. Appl. No. 17/977,730, "Corrected Notice of Allowability", U.S. Appl. No. 17/977,730, filed Dec. 22, 2023, 2 pages.

\* cited by examiner

FONT RECOMMENDATION

BACKGROUND won Digital content editing systems include multitudes of fonts that are usable to expand the ways, in which, text, numbers and other glyphs are represented within digital content, examples of which include webpages, digital documents, and so forth. Fonts, as employed in conventional systems, are manually selected to convey emotions, draw attention, impart ideas, and so forth. A content creator, for instance, selects a first font to draw attention to a title, a second font that is easily read for a body of text, and so forth.

Conventional techniques used to select fonts, however, are challenged by a lack of standardization, e.g., involving font types, font families, and so forth. Names used to represent a font, for instance, are typically chosen by a font designer and are often fanciful. As such, the names provide limited insight into what is an underlying goal of the designer of the font, e.g., an intended use of that font. This results in repeated user interaction as implemented by conventional systems to manually navigate through different font options and thus a corresponding decrease in operational efficiency of computing devices that implement these systems.

SUMMARY

Font recommendation techniques are described that overcome conventional challenges to provide recommendations of fonts based on a variety of factors, automatically and without user intervention in real time. This is performable in a variety of ways by addressing a wide range of considerations as part of machine learning, examples of which include context, popularity, similarity, customization, and topic compatibility.

Context, for instance, is usable to describe how the font is employed as part of digital content. The digital content editing system is also configured to take a variety of other aspects into consideration as part of generating the font recommendation by a font recommendation module. A popularity module, for instance, is configured to generate a popularity score that describes usage of respective fonts, e.g., in the document templates, from a font sharing service, and so forth. In another example, a similarity module is used to measure similarity of fonts in order to promote inclusion of visually different fonts in the recommendation, e.g., that are visually dissimilar to each other. In a further example, a customized module is employed to generate a customized score using a machine-learning module trained by a corpus of digital content corresponding to a respective user identifier. In yet another example, topic compatibility techniques are employed. A compatibility module, for instance, is configured to extract topics from digital content, e.g., using a machine-learning model, and output compatibility scores relating to those topics, thereby improving accuracy of the recommendation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
FIG. 1 depicts an example of a system implementing a font recommendation environment.
Figure 1:
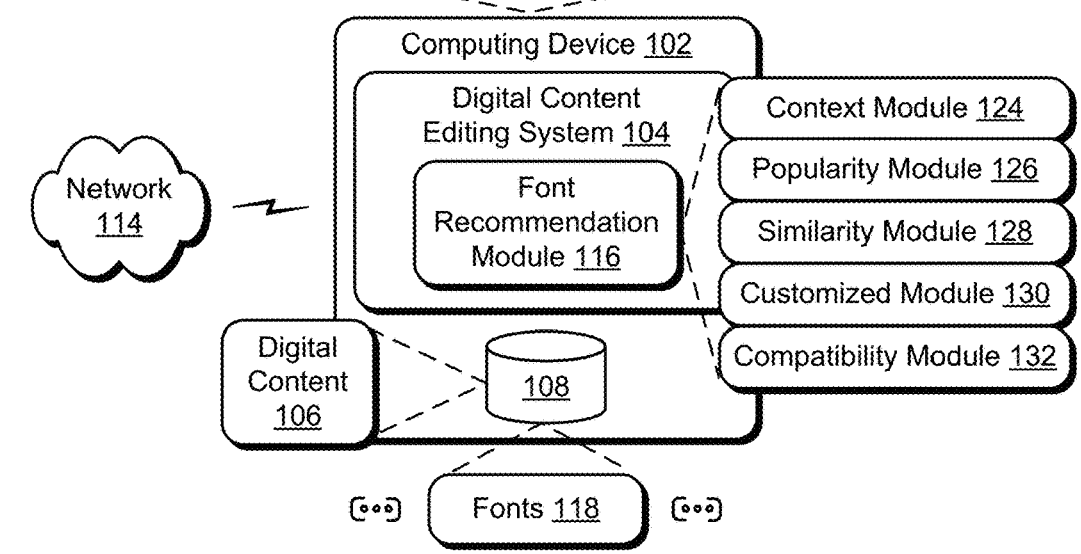

Digital content editing systems support access to thousands of fonts, each potentially having potentially tens of thousands of glyphs that are selectable to define the ways in which text, numbers, letters, and symbols are expressed as part of digital content. Because of this, content creators are tasked with developing specialized knowledge gained through long experience in order to locate particular fonts of interest. This issue is exacerbated by the pace at which new fonts are continually developed. As such, access to this functionality is typically difficult for users that have not gained this knowledge and experience in practice and is even difficult to maintain by experienced content creators to "stay current" regarding the newly created fonts.

Accordingly, font recommendation techniques are described that overcome these challenges to provide recommendations of fonts based on a variety of factors, automatically and without user intervention in real time. In this way, a digital content editing system that implements these techniques is configured to improve user and operational efficiency by enhancing font access. This is performable in a variety of ways by addressing a wide range of considerations as part of machine learning, examples of which include context, popularity, similarity, customization, and topic compatibility.

Context, for instance, is usable to describe how the font is employed as part of digital content. To leverage this, a machine-learning model is trained in one example using a font representation generated from document templates. To generate the font representation, the font is encoded. Font metrics and/or font features are also determined describing the context of the font within the document templates. Font metrics, for instance, are based on glyphs of the font as represented in the document template, e.g., font class, height, contrast, weights, widths, and so forth. Font features include text features (e.g., character count, word count), geometry features (e.g., text height, area, rotation, location), style features (e.g., color, opacity, backing shape), and so forth. Document features are also includable in the font representation to describe the digital content, itself, such as through document height and width, text counts, shapes, and so forth.

The encoding of the font along with the context described by the font metrics, font features, and/or document features are then used to form a vector to train a model, e.g., as a positive sample. In an implementation, a negative sample is also formed to train the model as part of a twin neural network, i.e., Siamese network. To generate the negative sample, a font class is determined for the positive sample. In one example, an addition font in a same font class as that of the positive sample is then used to form the negative sample a threshold number of times and an additional font that is "outside" of the font class is also used to form the negative sample another threshold amount of times. The document templates are formed for a candidate set of fonts that are selected based on a number of occurrences of the fonts as appearing in respective document templates, e.g., above a threshold amount.

The machine-learning model, once trained, is configured to generate a score for a plurality of fonts for inclusion in a subsequent item of digital content to generate recommendations. In this way, a content creator's current design of digital content is taken into account to improve accuracy in recommending fonts for inclusion in that design. The digital content editing system is also configured to take a variety of other aspects into consideration as part of generating the font recommendation by a font recommendation module. A popularity module, for instance, is configured to generate a popularity score that describes usage of respective fonts, e.g., in the document templates, from a font sharing service, and so forth. The popularity score is usable in a variety of ways as part of exploration and exploitation scenarios, such as to promote popular fonts to follow current trends, promote less popular fonts in order to encourage new trends, and so forth.

In another example, a similarity module is used to measure similarity of fonts in order to promote inclusion of visually different fonts in the recommendation. The similarity module, for instance, is usable to leverage the encoding of the font described above as part of a distance determination to promote inclusion of fonts that are visually different within the recommendation, e.g., that are dissimilar based on encodings that are at least a threshold distance apart.

In a further example, a customized module is employed to generate a customized score using a machine-learning module trained by a corpus of digital content corresponding to a respective user identifier (ID). A service provider system, for instance, maintains digital content corresponding to respective content creators using corresponding user IDs. This corpus is then used to train a machine-learning module, e.g., using the context-based techniques described above. As a result, the customized module is configured to also generate scores in order to recommend fonts based on digital content edited in the past for that user ID, which also improves accuracy and thus operation of computing devices that implement these techniques.

In yet another example, topic compatibility techniques are employed. A compatibility module, for instance, is configured to extract topics from digital content, e.g., using a machine-learning model. The topics are includable as part of the training data to train the machine-learning model as described above for context to also take into account topics corresponding to that context. In this way, the machine-learning module supports word associations between font and topic embeddings to improve accuracy in recommendations generated for the subsequent item of content.

As a result, the font recommendation techniques described in the following sections are usable to generate font recommendations from thousands of fonts without having specialized knowledge regarding font types and families. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Font Recommendation Environment

FIG. 1 is an illustration of a digital medium environment 100 in an example font recommendation implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a digital content editing system 104. The digital content editing system 104 is implemented using a processing device and computer-readable storage medium of the computing device 102 to create, process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Examples of digital content 106 include webpages, digital documents, user interfaces as output through execution of an application, digital images, digital videos, and so forth. Although illustrated as implemented locally at the computing device 102, functionality of the digital content processing system 104 is also configurable as whole or part via functionality available via the network 114, such as part of a web service or "in the cloud."

An example of functionality incorporated by the digital content editing system 104 to process the digital content 106 is illustrated as a font recommendation module 116. The font recommendation module 116 is representative of functionality implemented by the computing device 102, automatically and without user intervention in real time, to generate a recommendation of fonts 118 for use in editing the digital content 106.

Scripts correspond to collections of letters, numbers, and symbols, e.g., Latin, Greek, and so on. Accordingly, scripts include a multitude of fonts 118, which are a set of the letters, numbers, and symbols of the script in a particular style and size. Glyphs are elemental symbols with respective fonts 118 corresponding to individual instances of the letters, numbers, and symbols in the particular style and size for the font 118. The glyphs are identifiable using a respective Unicode identifier (ID), i.e., Unicode value. Unicode is a standard used to promote consistent encoding, representation, and management of the letters, numbers, and symbols of glyphs across different types of fonts 118. Glyph identifiers (ID) are used to identify different glyphs corresponding to a same Unicode ID, e.g., a base glyph and alternate glyphs.

Thus, the digital content editing system 104 supports a variety of different scripts, e.g., Latin, Roman, Greek, and so forth. Each of these scripts includes hundreds and even thousands of different fonts. Fonts 118 are arrangeable in font families referred to as "typefaces" to support variations, such as extra bold, bold, regular, italics, and so forth. Glyphs are used as part of the font to represent individual characters, letters, numbers, punctuation, and other symbols. Fonts 118 typically include hundreds and even thousands of different glyphs. Conventional techniques that provide access to fonts 118, however, typically rely on specialized knowledge that oftentimes becomes quickly outdated as fonts are continually developed to expand digital content creation and editing functionality.

Accordingly, the font recommendation module 116 is configured to analyze an item of digital content 120 that is a current subject of user interaction (e.g., is being edited in the user interface 110) and generate a recommendation 122 in real time, e.g., as a list of representations of fonts 118 recommended for use as part of creating the digital content 120. In the illustrated example, the recommendation 122 includes previews of respective fonts 118 as the fonts may appear as included within the digital content 120, e.g., having a corresponding size and colors of glyphs that are being editing in the digital content 120. Glyphs included in the text "Harvest Festival," for instance, are illustrated as selected. In response, this text is shown as being rendered in the user interface 110 as having a corresponding size and color for corresponding glyphs in recommended fonts as part of the recommendation 122. As a result, the recommendation 122 provides insight that is non-modal and as such does not involve user navigation away from the user interface 110 as configured to edit the digital content 120, thereby increasing efficiency of user interaction with the digital content editing system 104.

The font recommendation module 116 is configured to generate the recommendation 122 by taking into account a variety of aspects. Examples of functionality representing these aspects includes a context module 124, a popularity module 126, a similarity module 128, a customized module 130, and a compatibility module 132.

The font recommendation module 116, for instance, is configured to generate a list of fonts as part of the recommendation 122 based on a current state of digital content 120 being edited by the digital content editing system 104 through use of the context module 124. To do so, the context module 124 is employed to train a machine-learning model using training digital content, such as document templates that are made available via a service provider system as further described in relation to FIG. 3. Context properties are extracted by the context module 124 from the training digital content, e.g., text features, geometry features, style features, document features, an encoding generated for fonts included in the document templates, and so on.

This training data is then used to train the machine-learning model to address contextual properties with corresponding fonts. After training, the machine-learning model employed by the context module 124 is configured to score a subsequent font given contextual properties extracted from the digital content 120, e.g., as a ranked list as further described in relation to FIGS. 3 and 4. In real world scenarios, accuracy of the machine-learning model as employed by the context module 124 is over ninety-four percent. The machine-learning model, once trained, also generalizes to fonts not used during training thereby supporting continued use as part of subsequent font development without retraining the model, thereby improving computing device efficiency and availability.

Figure 5:
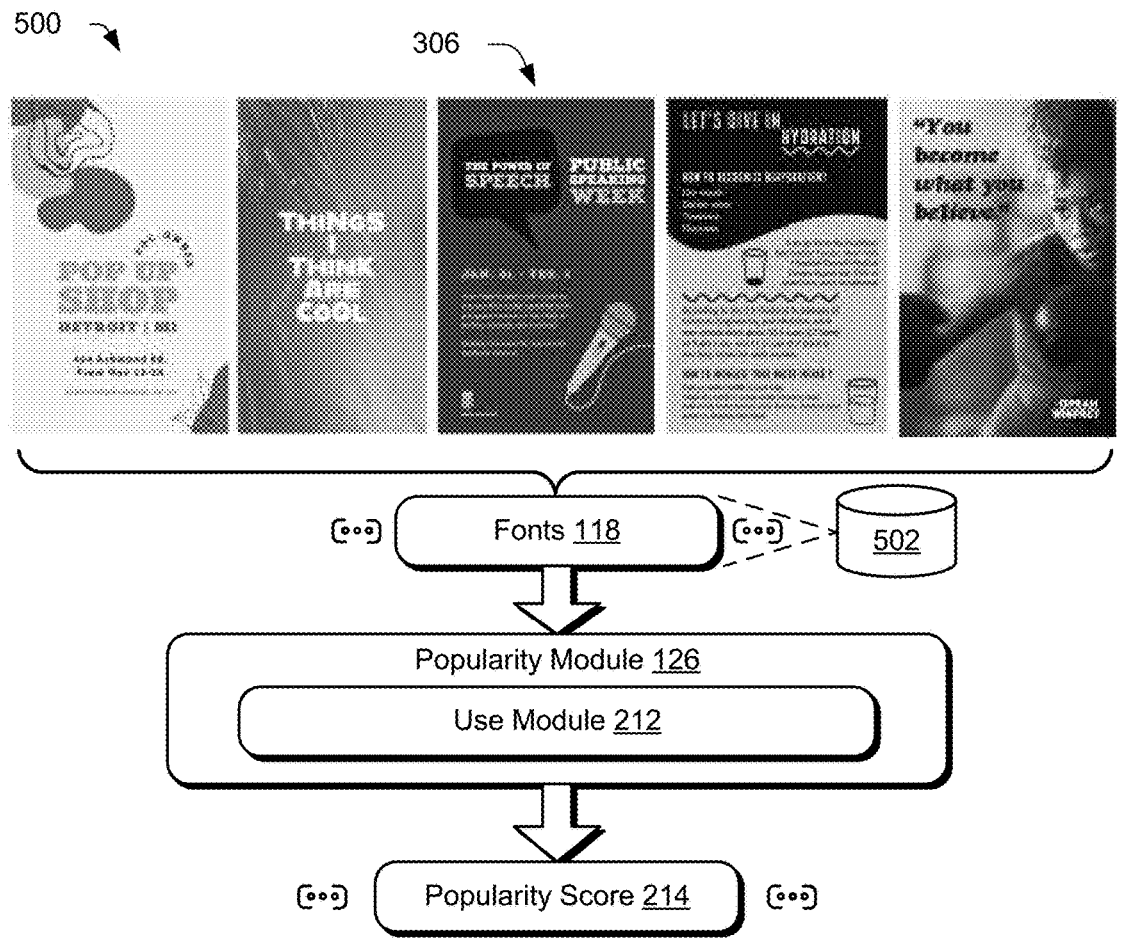
FIG. 5 depicts an example of operation of a popularity module of FIG. 2 in greater detail.

The font recommendation module 116 is also usable to incorporate additional aspects as part of generating the recommendation 122. In one example, the popularity module 126 is used to increase or decrease scores of respective fonts based on respective popularities, such as to promote or demote fonts in a ranking based on popularity as further described in relation to FIG. 5.

Figure 6:
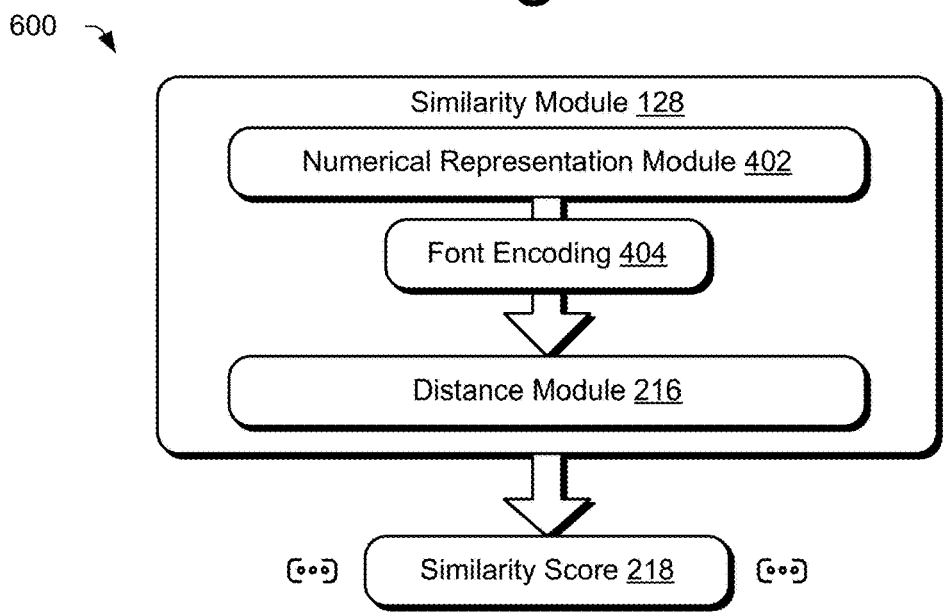
FIG. 6 depicts an example of operation of a similarity module of FIG. 2 in greater detail.

In another example, the font recommendation module 116 is configured to address visual similarity of fonts through use of a similarity module 128. This is usable, for instance, to provide font diversity in the recommendation as further described in relation to an example 600 of FIG. 6.

Figure 7:
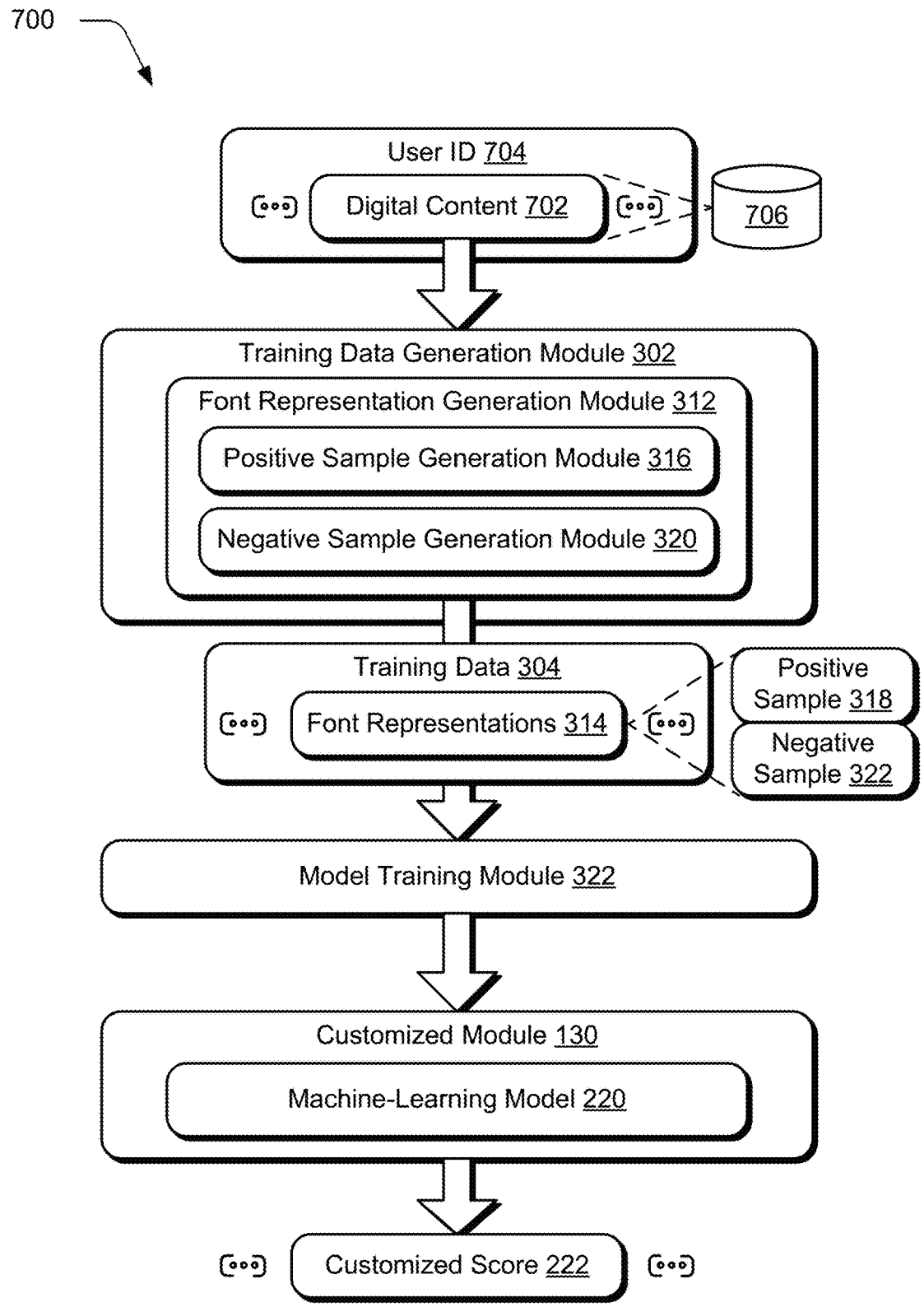
FIG. 7 depicts an example of operation of a customized module of FIG. 2 in greater detail.

Personalization is also supported through use of a customized module 130. To do so, a model is trained using machine learning based on a corpus associated with a particular user identifier as further described in relation a system 700 of FIG. 7.

Figure 8:
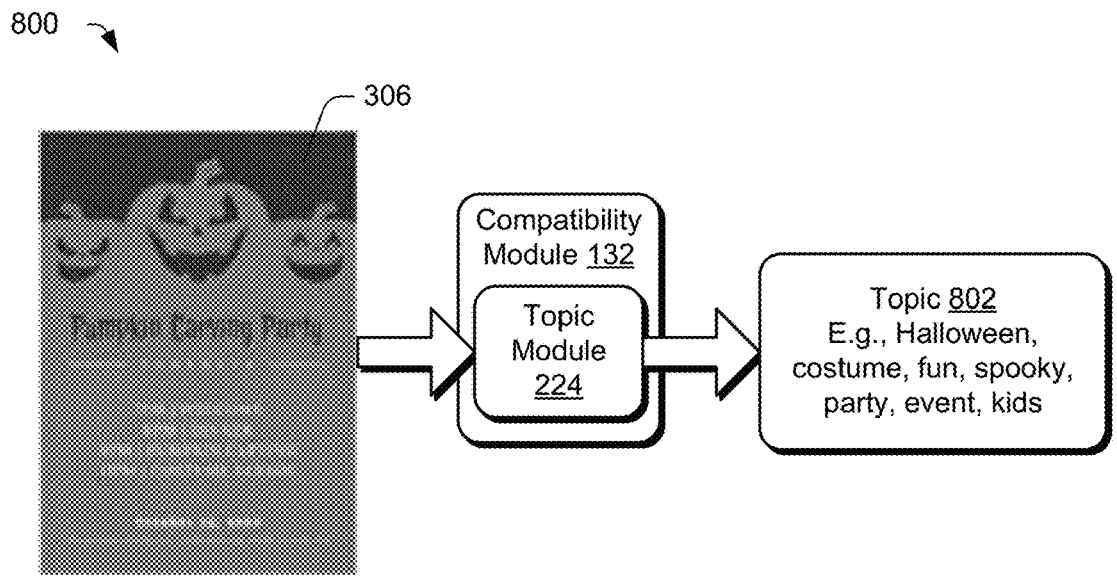
FIG. 8 depicts an example of topic extraction using a topic module.
Figure 9:
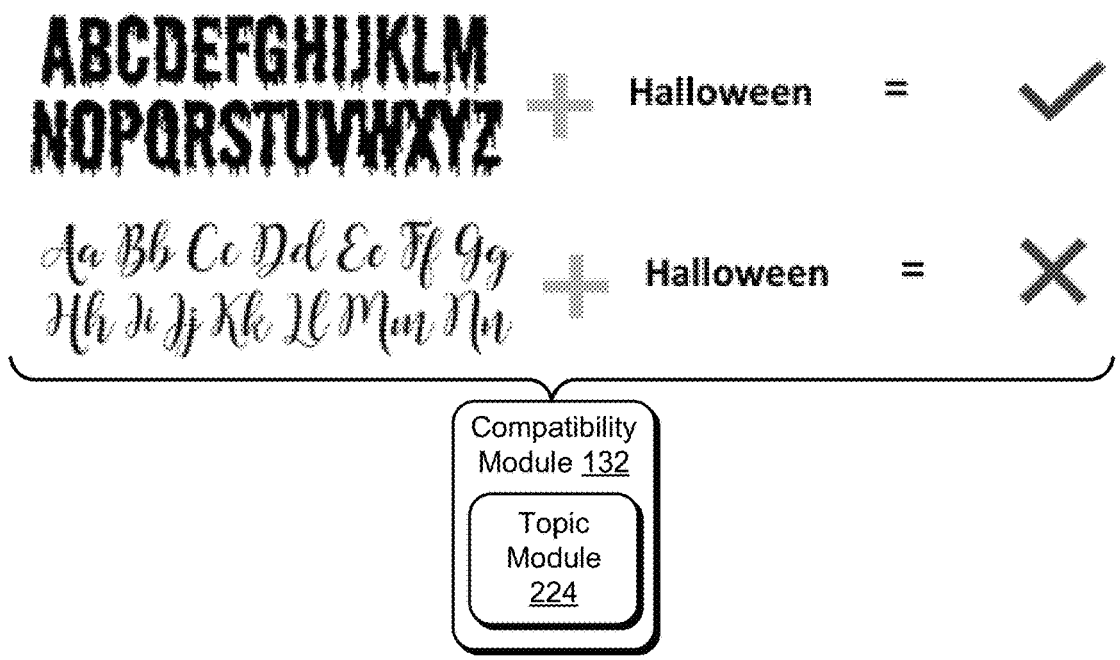
FIG. 9 depicts an example of compatibility and incompatibility of fonts with respect to a topic.

In an additional example, a compatibility module 132 is employed by the font recommendation module 116. The compatibility module 132 is configured to promote fonts that are compatible with topics extracted from the digital content 120 as further described in relation to FIGS. 8-10. In this way, the font recommendation module 116 improves accessibility to a multitude of fonts 118 that are typically available for use as part of digital content 106 editing, further discussion of which is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Font Recommendation Generation

Figure 2:
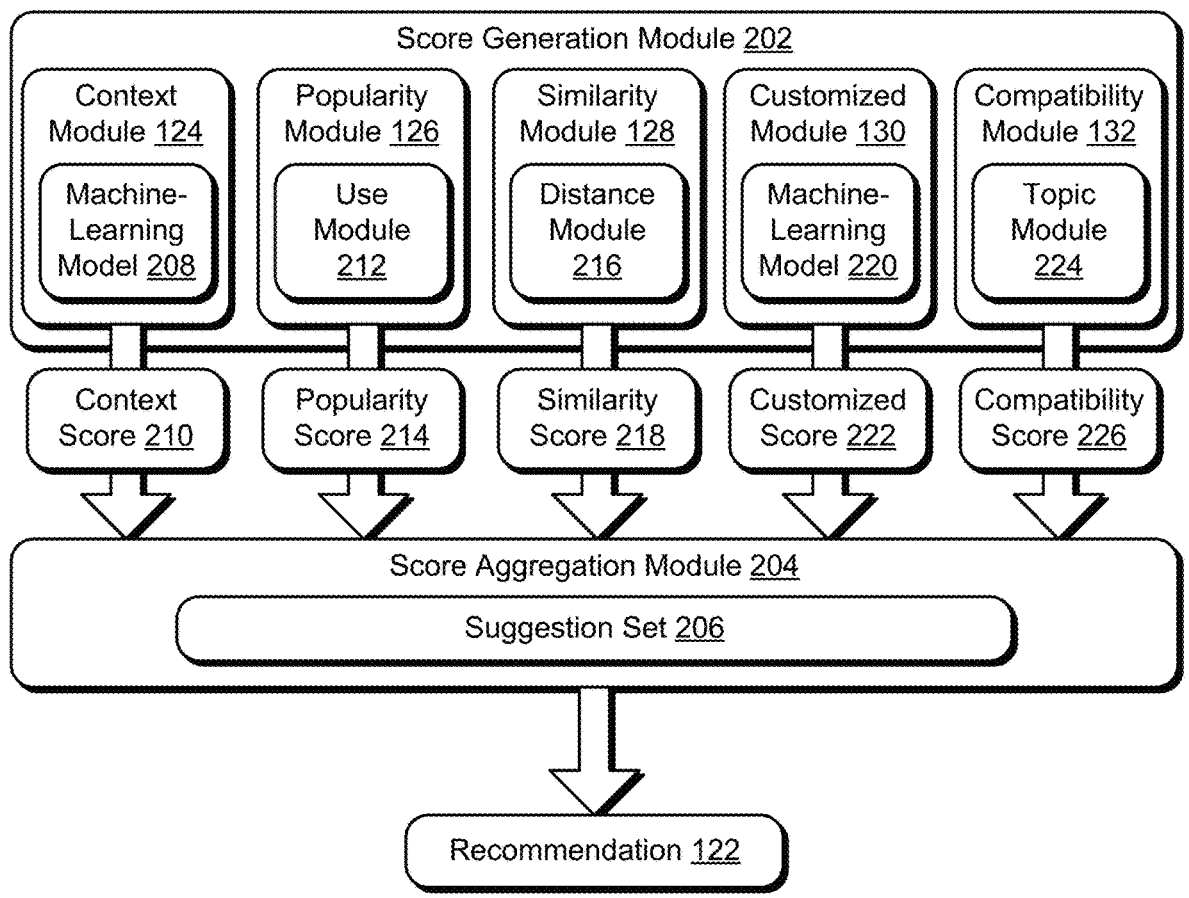
FIG. 2 depicts a system in an example implementation showing operation of a font recommendation module of FIG. 1 in greater detail.

FIG. 2 depicts a system in an example implementation showing operation of the font recommendation module 116 of FIG. 1 in greater detail. The font recommendation module 116 includes a score generation module 202 that is configured to generate scores for a variety of aspects as previously described above. A score aggregation module 204 is then employed in this example to form a suggestion set 206 by aggregating scores generated by the score generation module 202, and from this, generate the recommendation 122 that is output in the user interface 110. A variety of aspects and corresponding scores are employable by the score generation module 202.

The context module 124, for instance, is configured to employ a machine-learning model 208 to generate a context score 210 describing a respective suitability of a respective font for inclusion with the digital content 120 based on context. In this way, the font recommendation module 116 generates the recommendation 122 based at least in part on "what the user is working on" and thus increases accuracy of the recommendation 122.

Figure 3:
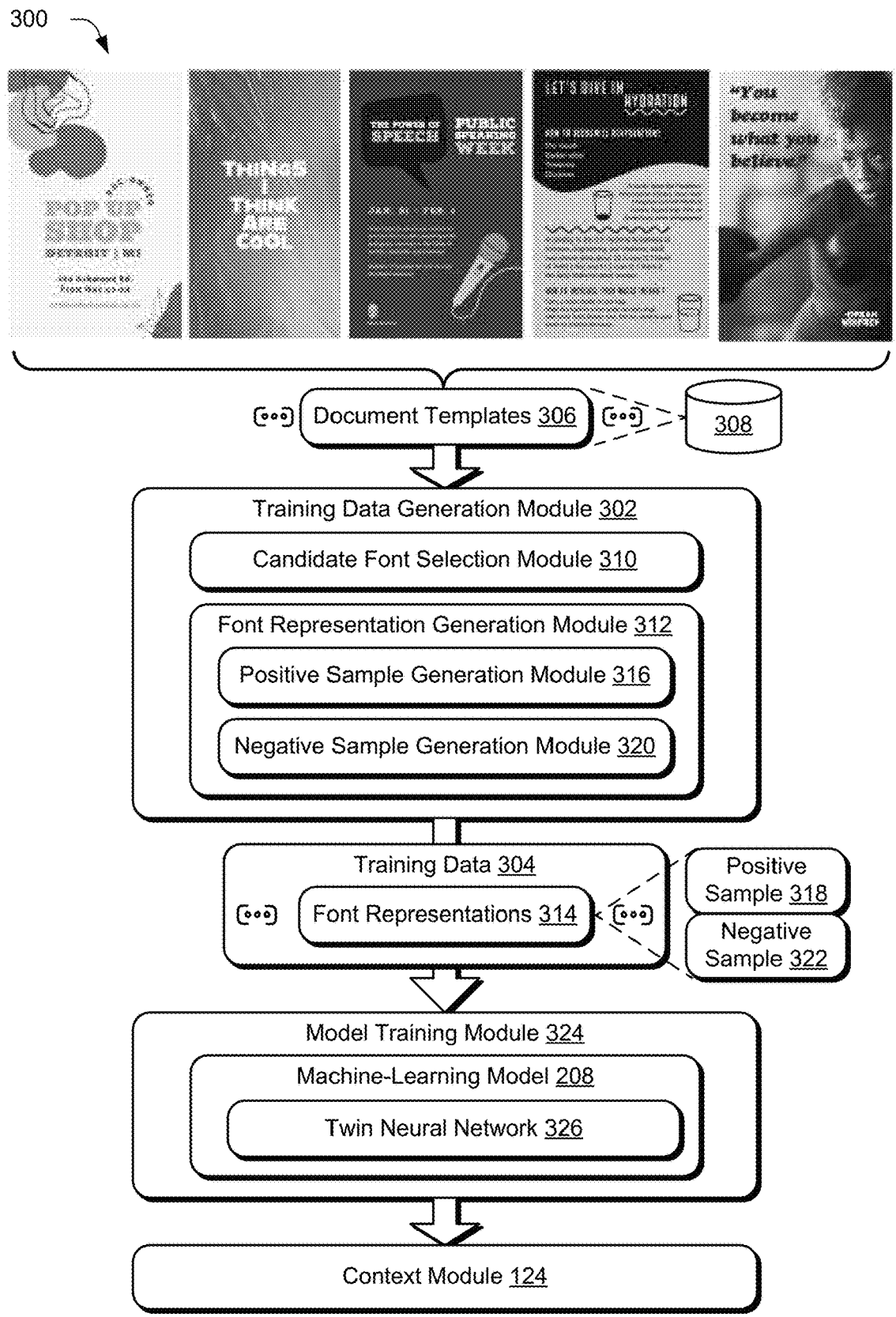
FIG. 3 depicts an example system showing training of a machine-learning model of a context module of FIG. 2 in greater detail.

FIG. 3 depicts an example system 300 showing training of the machine-learning model 208 of the context module 124 in greater detail. A training data generation module 302 is configured to generate training data 304 to train the machine-learning model 208 to generate font recommendations based on context.

To do so, the training data generation module 302 obtains document templates 306 from a repository 308, e.g., a storage device. The document templates 306, for instance, are developed by content creators and made available via a content creation platform, e.g., for a subscription, fee, and so forth. Illustrated examples of the document templates 306 include use of different fonts at respective locations for a variety of topics and thus serve as an accurate basis to train the machine-learning model 208.

In practice, approximately sixty thousand templates are available having a quarter of a million font samples. Therefore, in an implementation a candidate font selection module 310 is employed to select a set of candidate fonts that are to be used as a basis to obtain corresponding document templates 306 to train the machine-learning model 208. The candidate font selection module 310, for instance, generates the list of candidate fonts based on a number of occurrences in the templates, e.g., as appearing in over three templates, one-hundred templates, and so on. Other examples are also contemplated, including information obtained from a digital font sharing service that is based on font popularity. Document templates 306 having the candidate fonts are then obtained for use in training the machine-learning model 208.

The machine-learning model 208 is trained as a function to give preference to an original font included in the document templates 306 for a given context, e.g., text, location, design, and so forth. To do so, a font representation generation module 312 is utilized to generate font representations 314 to numerically represent the font and corresponding context within the document templates 306. The document templates 306, for instance, are utilized by a positive sample generation module 316 as positive samples 318 of "good" associations of font and context. A negative sample generation module 320 is also employed to generate a negative sample 322, e.g., based on the positive sample 318.

Figure 4:
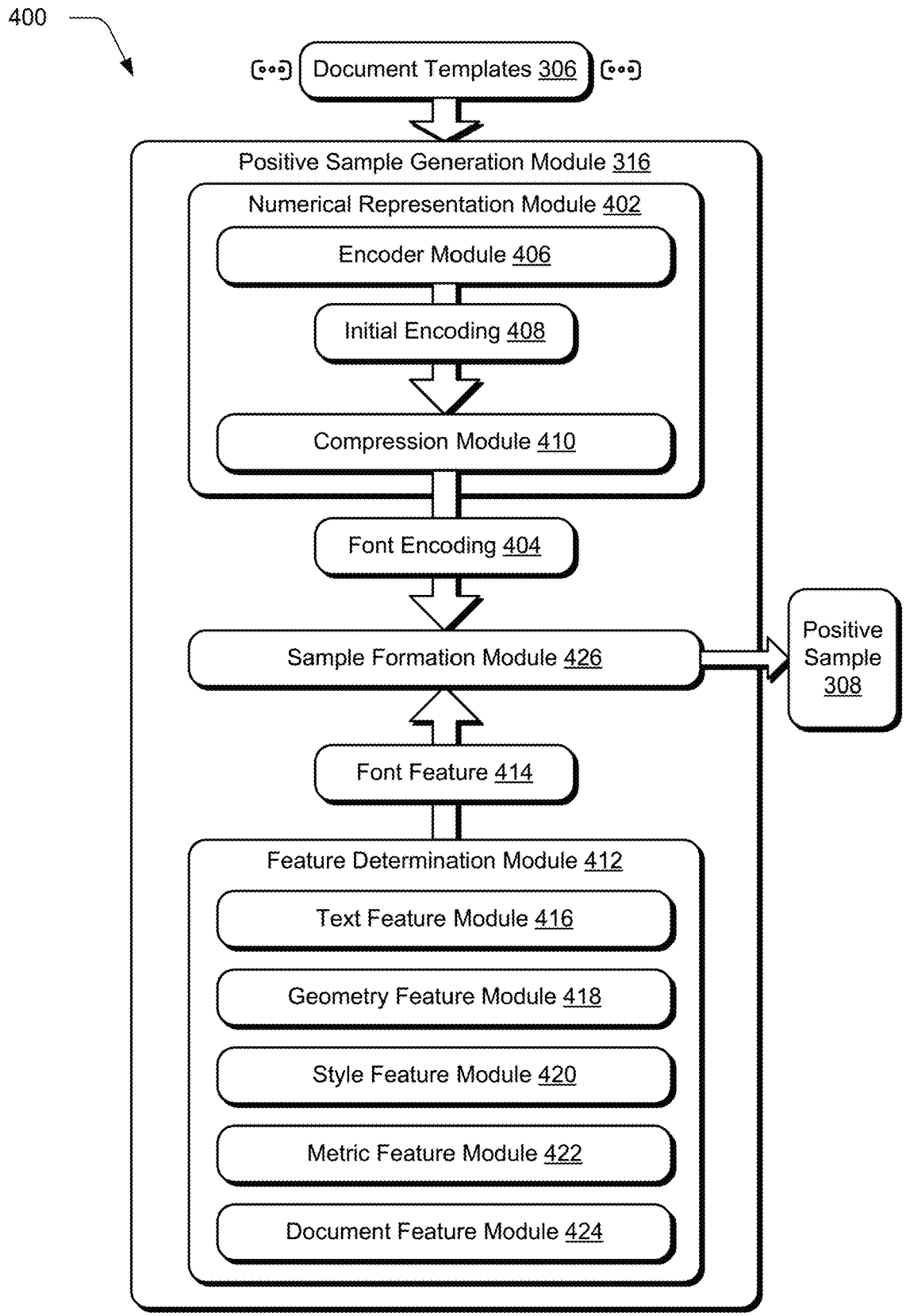
FIG. 4 depicts a system in an example implementation showing operation of a positive sample generation module of FIG. 3 in greater detail to generate a font representation of a context of a font within document templates.

FIG. 4 depicts a system 400 in an example implementation showing operation of the positive sample generation module 316 of FIG. 3 in greater detail to generate a font representation of a context of a font within the document templates 306. A numerical representation module 402 is employed to generate a font encoding 404 of fonts included in the document templates 306. To do so, an encoder module 406 is employed to generate an initial encoding 408 of glyphs of the font, e.g., as a vector having 768 dimensions using a convolutional neural network. A variety of techniques are usable to generate the initial encoding 408, an example of which is described by U.S. Pat. No. 9,501,724 "Font Recognition and Font Similarity Learning using a Deep Neural Network," the entire disclosure of which is hereby incorporated by reference. A compression module 410 is then utilized to compress the initial encoding 408 to form the font encoding 404. This is also performable in a variety of ways, an example of which includes an autoencoder that compresses the initial encoding 408 to a lower dimension using three layers of "ReLu" units (e.g., 128, 64, 32) which compresses the 768-dimensional vector into a 32-dimensional vector.

A feature determination module 412 is also employed to detect the context of the font within the document templates 306, such as to detect at least one font feature 414 describing how a glyph of the font is included as part of the item of digital content. Examples of functionality usable to detect font features are represented using a text feature module 416, a geometry feature module 418, a style feature module 420, a metric feature module 422, and a document feature module 424.

The text feature module 416 is configured to detect text features from the document templates 306, examples of which include character count, word count, sentence count, line count, word length, and so on. The geometry feature module 418 is configured to detect geometry features, examples of which text height, text width, area, font size, rotation, or location within the digital content, e.g., the document templates 306. The style feature module 420 is configured to detect style features, such as color, opacity, backing shape, layout, spacing, padding, tracking, stroke weight, and so forth.

The metric feature module 422 is configured to detect font metrics such as measurements, font classes, and so forth. The metric feature module 422, for instance, detects font metrics including ascender height, descender height, digit height, lowercase contrast, lowercase height, lowercase stem height, lowercase stem width, lowercase weight, lowercase width, uppercase contrast, uppercase height, stem height, uppercase stem width, uppercase weight, uppercase width, and so on. The metric feature module 422 is also configured to detect a font class, to which, the font belong, e.g., serf, sans serif, decorative, handwritten, blackletter, script, and so forth.

The document feature module 424 is implemented to detect document features of the digital content (e.g., the document templates 306), in which the font resides. Examples of document features include document height, document width, layout, text counts, digital images, shapes, or groups. A variety of other font feature examples are also contemplated to describe font context within the document templates 306. The font features 414 are included with the font encoding 404 by a sample formation module 426 to form the positive sample 318 of a font representation 314, e.g., as a vector.

The negative sample generation module 320 then forms the negative sample 322 based on the positive sample 318. The negative sample generation module 320, for instance, identifies an additional font in a same font class as that of the positive sample 318. The negative sample 322 is then generated by the negative sample generation module 320 to include the additional font, e.g., as replacing the glyphs in the positive sample 318 with corresponding glyphs, colors, size, and so forth. In this way, the negative samples 322 are configured to leverage smaller differences in visual similarity. In another example, the negative sample 322 is generated by forming the negative sample 322 from the same font class a threshold number of times (e.g., 50%) and for a different font class a threshold number of times, i.e., "outside" of the same font class.

The training data 304, including the font representations 314, is received as an input by a model training module 324 to train the machine-learning model 208. In the illustrated example, the machine-learning model 208 is implemented as a twin neural network 326, which is also known as a Siamese network. A twin neural network 326 uses the same weights while simultaneously working on two input vectors. The machine-learning model 208 is also configurable in a variety of other ways. Once trained, the machine-learning model 208 is employed by the context module 124 to generate a context score 210 by leveraging context as well as fonts in order to generate the recommendation 122.

Returning again to FIG. 2, context in one of a variety of aspects usable by the font recommendation module 116 to generate the recommendation 122. Other examples include a use module 212 of a popularity module 126 to generate a popularity score 214 to control which font are included in the recommendation 122 based on popularity. A shown in an example implementation 500 of FIG. 5, for instance, the use module 212 obtains data from a font repository system 502. The font repository system 502 is configured to make fonts available for content editing, e.g., by a respective digital content editing system 104. Therefore, the use module 212 is configured to set a popularity score 214 for respective fonts 118 based on this use. In another example, the use module 212 determines frequency of respective fonts 118 in digital content, e.g., the document templates 306. This popularity score 214 is usable to increase likelihood of popular fonts 118 in a recommendation 122 (also known as exploitation), explore new fonts by selecting popular fonts 118 for inclusion in the recommendation 122, and so forth.

In another example, the similarity module 128 employs a distance module 216 that is configured to output a similarity score 218, e.g., which is usable to promote diversity of fonts includes in the recommendation. The distance module 216 incudes a numerical representation module 402 that is configured to form a font encoding 404 as a numerical representation of visual aspects of respective fonts 118 as described in relation to FIG. 4. The distance module 216 is then utilized to compute a distance between the font encodings 404 (e.g., in a vector space) generated for respective fonts 118 in order to promote inclusion of visually different fonts in the recommendation 122. The distance module 216, for instance, is configured to generate respective similarity score 218 to promote inclusion of fonts 118 in the recommendation 122 that are at least a threshold distance apart, one to another. Other examples are also contemplated.

Figure 10:
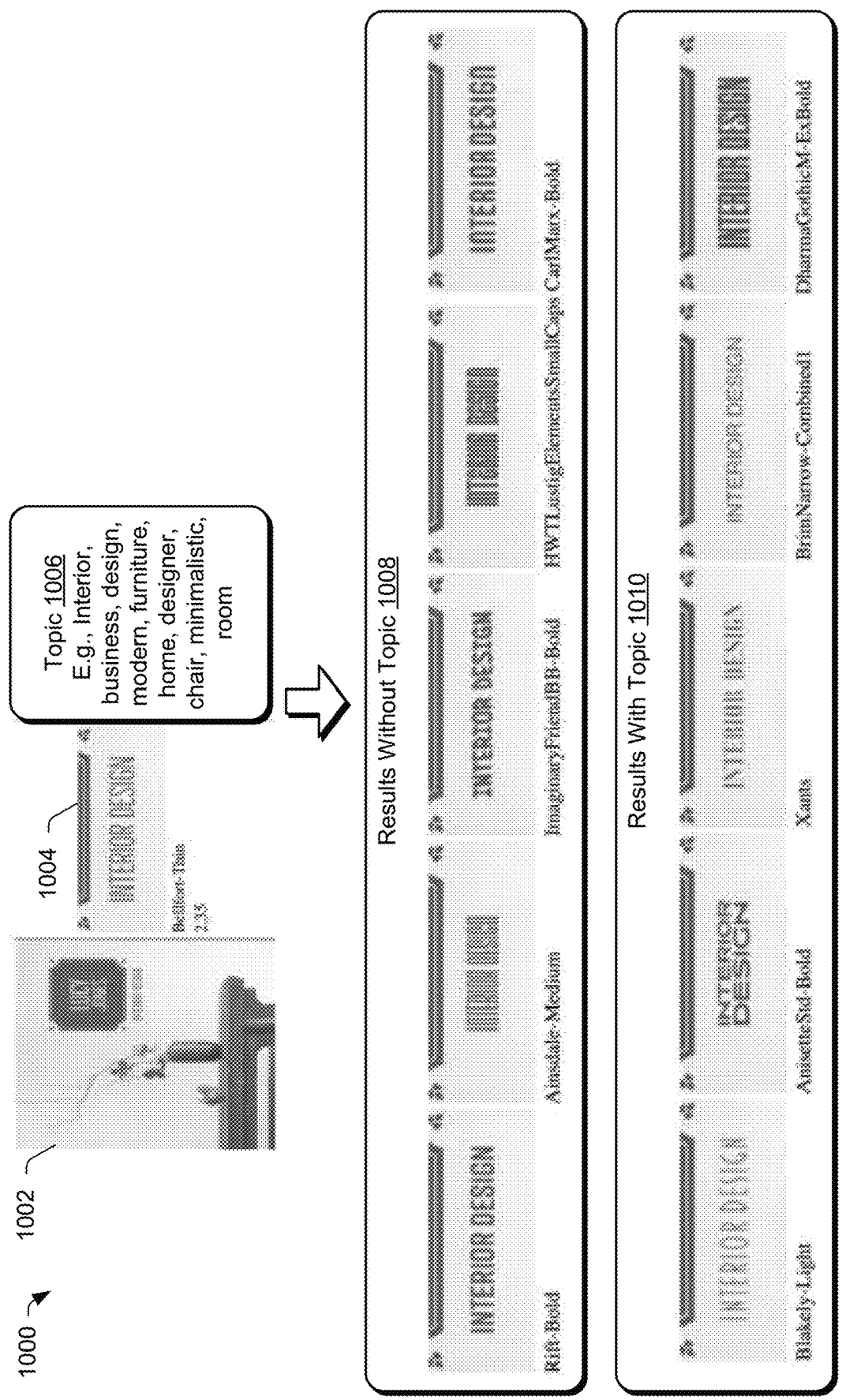
FIG. 10 depicts a system showing training and use of a machine-learning model for use in personalization in greater detail.

In a further example, the customized module 130 employs a machine-learning model 220 to generate a customized score 222 in order to support personalization of the fonts 118 in the recommendation 122, e.g., to include font commonly utilized by a respective creative professional. FIG. 10, for instance, depicts a system 700 showing training and use of the machine-learning model 220 in greater detail. The training data generation module 302 forms training data 304 that includes font representations 314 as previously described in relation to FIG. 3.

In this example, however, a corpus is obtained of digital content 702 that corresponds to a user identifier (ID) 704 from a storage device 706. The user ID 704, for instance, corresponds to a creative professional and thus the digital content 702 provides insight into contexts and fonts desired by the creative professional. The training data 304, therefore, is usable to train a machine-learning model 220 of the customized module 130 to generate a customized score 222 for respective fonts and contexts that is customized to the creative professional, thereby improving accuracy of the recommendation 122.

The compatibility module 132 includes a topic module 224 that is configured to generate a compatibility score 226 indicating compatibility of a font with a topic extracted from digital content. As shown in an example 800 of FIG. 8, a document template 306 relating to a pumpkin carving party is processed by the topic module 224 to extract topics 802 such as Halloween, costume, fun, spooky, party, event, and kids. This is performable in a variety of ways, an example of which is described through determining global intent in U.S. patent application Ser. No. 17/583,818, filed Jan. 25, 2022, the entire disclosure of which is hereby incorporated by reference. A font/topic machine-learning model, for instance, uses a font/topic Word2Vec compatibility model to determine associations between font and topic embeddings in a feature space. Compatibility with a topic, therefore, is usable to gain insight as shown in an example 900 of FIG. 9 as to which fonts correspond to particular topics.

FIG. 10 depicts an example implementation 1000 showing improvements gained in recommendation generation by leveraging topic compatibility. Digital content 1002 and a corresponding font 1004 are processed by the compatibility module 132 to extract a topic 1006. The topic 1006 is represented using keywords such as interior, business, design, modern furniture, home, designer, chair, minimalistic, and room. Results without use of topic 1008 are depicted, which while including some visually consistent recommendations also include recommendations that are not compatible with the topic 1006, e.g., recommendation of "ImaginaryFriend BB-Bold" font. Results with use of topic 1010, on the other hand, are visually compatible and thus promote accuracy in generation of the recommendation 122.

The score aggregation module 204 generates the recommendation 122 based on a combination of one or more of these scores. In one example, each candidate font is scored based on context and popularity. A threshold number of fonts achieving the top scores are added to a suggestion set 206. A distance from each candidate font to the suggestion set 206 is calculated and rescored based on context, popularity, and similarity, e.g., score equals (context score 210)+ (0.5*popularity score 214)+(similarity score 218). Adding the compatibility score 226 is also includable as another term in the scoring function, e.g., score equals (context score 210)+(0.5*popularity score 214)+(similarity score 218)+ (compatibility score 226). The customized score 222 is also usable to re-rank fonts in the recommendation 122, such to promote contextually appropriate fonts previously used by an associated user ID. In this way, the font recommendation module 116 aggregates font usage with contextual signals for real time querying.

Example Procedures

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
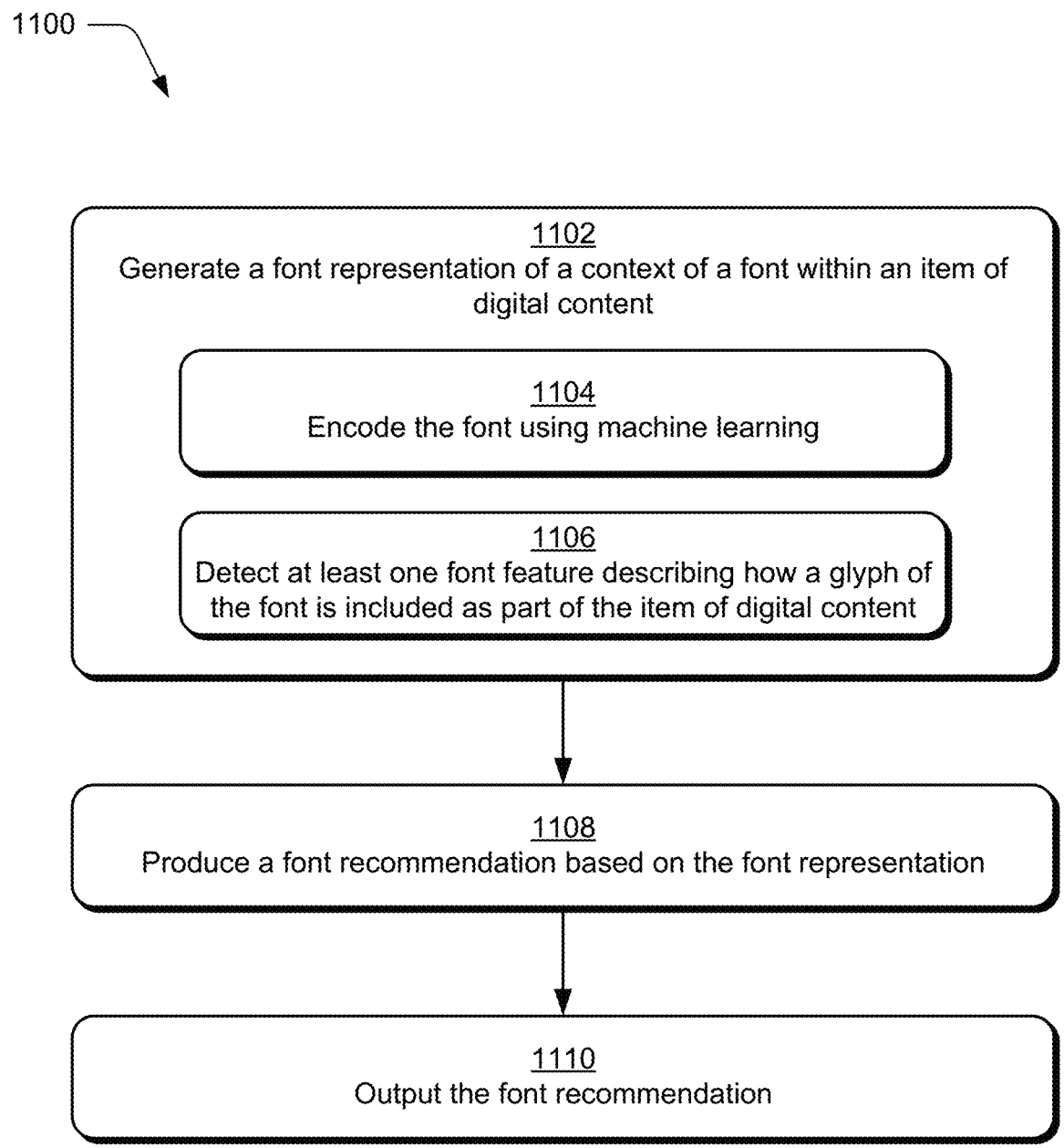
FIG. 11 depicts a procedure in an example implementation of font representation generation and machine-learning model training for contextual font recommendations.

FIG. 11 depicts a procedure 1100 in an example implementation of font representation generation and machine-learning model training for contextual font recommendations. A font representation is generated of a context of a font within an item of digital content (block 1102). The font representation, for instance, is a numerical representation of both the font and a context of a font within the digital content. In an example, the generating includes encoding the font using machine learning (block 1104), e.g., to form a vector representation of the font. At least one font feature is detected describing how a glyph of the font is included as part of the item of digital content (block 1106). The font feature, for instance, describes font metrics, text features, geometric features, style features, document features, and so on. In an implementation, these features are described mathematically and included as part of the vector representation of the font, i.e., the encoding.

A font recommendation is then produced based on the font representation using a machine-learning model (block 1108). The machine-learning model, for instance, is trained using similar types of font representations for training digital content, e.g., document templates, etc. The font recommendation is then produced by processing the font representation generated for the item of digital content using this machine-learning model (block 1108). The font recommendation is output (block 1110), e.g., in the user interface 110 of FIG. 1 as recommendation 122. Other examples are also contemplated.

Example System and Device

Figure 12:
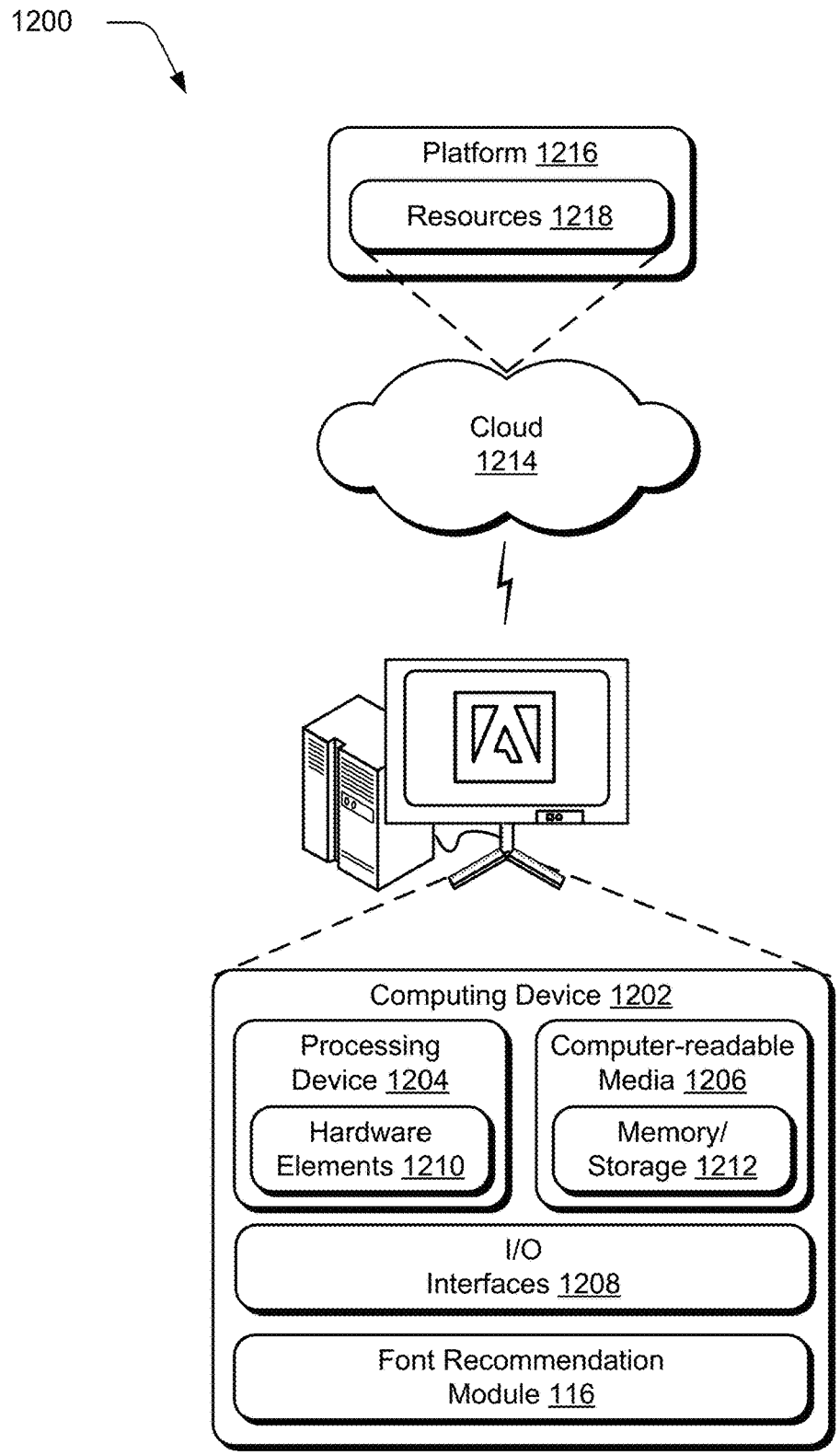
FIG. 12 illustrates an example computing device that is representative of one or more computing systems and/or devices that implement the various techniques described herein.

FIG. 12 illustrates an example system generally at 1200 that includes an example computing device 1202 that is representative of one or more computing systems and/or devices that implement the various techniques described herein. This is illustrated through inclusion of the font recommendation module 116. The computing device 1202 is configurable, for example, as a server of a service provider, a device associated with a client (e.g., a client device), an on-chip system, and/or any other suitable computing device or computing system.

The example computing device 1202 as illustrated includes a processing device 1204, one or more computer-readable media 1206 (having instructions that causes operations by the processing device), and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1204 is representative of functionality to perform one or more operations using hardware. Accordingly, the processing device 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing device 1204. The instructions and/or functions are executable/operable by one or more articles of manufacture (for example, one or more computing devices 1202 and/or processing devices 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating, by a processing device, a font representation of a context of a font within an item of digital content, the generating including:
   encoding the font using machine learning; and
   detecting at least one font feature describing how a glyph of the font is included as part of the item of digital content;
   producing, by the processing device, a font recommendation based on the font representation using a machine-learning model; and
   outputting, by the processing device, the font recommendation.

2. The method as described in claim 1, wherein the encoding includes forming an initial encoding using an encoder module and generating a font encoding of the font by compressing the initial encoding.

3. The method as described in claim 1, wherein the detecting of the at least one font feature includes determining a font metric based on the glyph of the font included as part of the item of digital content.

4. The method as described in claim 3, wherein the font metric includes ascender height, descender height, digit height, lowercase contrast, lowercase height, lowercase stem height, lowercase stem width, lowercase weight, lowercase width, uppercase contrast, uppercase height, stem height, uppercase stem width, uppercase weight, or uppercase width.

5. The method as described in claim 3, wherein the font metric includes a font class, to which, the font belongs.

6. The method as described in claim 1, wherein the at least one font feature includes text features, geometry features, or style features of the font within the digital content.

7. The method as described in claim 6, wherein the text features include a character count, word count, sentence count, line count, or word length.

8. The method as described in claim 6, wherein the geometry features include text height, text width, area, font size, rotation, or location within the digital content.

9. The method as described in claim 6, wherein the style features include color, opacity, backing shape, layout, spacing, padding, tracking, or stroke weight.

10. The method as described in claim 1, wherein the detecting the at least one font feature includes determining a document feature of the digital content that includes the font.

11. The method as described in claim 10, wherein the document feature includes document height, document width, layout, text counts, digital images, shapes, or groups.

12. The method as described in claim 11, wherein the producing the recommendation based on the font representation is based at least in part on popularity of the font.

13. The method as described in claim 11, wherein the producing the recommendation based on the font representation is based at least in part on similarity of the font to other said fonts such that the recommendation includes the other said fonts that are visually different.

14. The method as described in claim 11, wherein the producing the recommendation based on the font representation is based at least in part on compatibility to a topic extracted from the digital content.

15. The method as described in claim 1, wherein the machine-learning model is trained as a twin neural network using a plurality of document templates.

16. A method comprising:
forming, by a processing device, training data from a plurality of document templates, the forming including:
generating a positive sample by encoding fonts included within the plurality of document templates using machine learning and detecting at least one font feature describing how glyphs of the fonts are included as part of the plurality of document templates, respectively; and
generating a negative sample based on the positive sample;
configuring, by the processing device, a machine-learning model to generate a font recommendation based on font context by training the machine-learning model using the training data; and
outputting, by the processing device, the trained machine-learning model.

17. The method as described in claim 16, wherein the generating of the negative sample includes identifying an additional font in a same font class as that of the positive sample and the negative sample includes the additional font.

18. The method as described in claim 17, wherein the generating the negative sample performs the identifying for a threshold number of times for the additional font in the same font class and a threshold number of times for a font outside the same font class.

19. The method as described in claim 16, wherein the forming is performed for a plurality of candidate fonts and further comprising identifying the plurality of candidate fonts based on a number of occurrences of the candidate fonts and obtaining the plurality of document templates based on the identifying.

20. One or more non-transitory computer readable storage media storing instructions that, responsive to execution by a processing device, causes the processing device to perform operations comprising:
generating a font representation of a context of a font within an item of digital content, the generating including:
encoding the font using machine learning; and
detecting at least one font feature describing how glyphs of the font are included as part of the item of digital content; and
producing a font recommendation based on the generated font representation using a machine-learning model.

* * * * *